June 16, 1931.  C. FLAGSTAD  1,810,103
CLUTCH CONTROL DEVICE
Filed Dec. 31, 1928  2 Sheets-Sheet 1
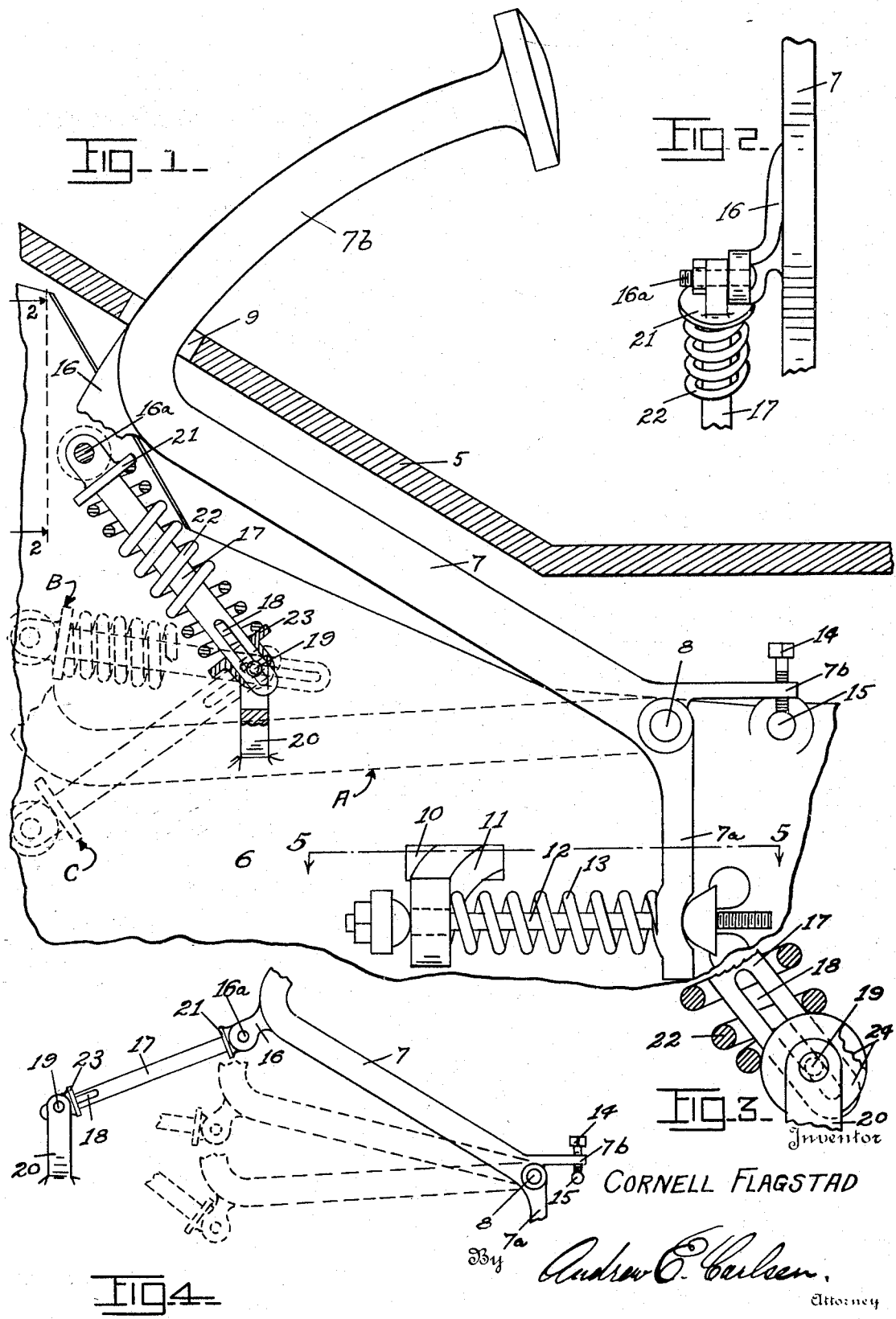
Inventor
CORNELL FLAGSTAD
By Andrew C. Carlsen
Attorney June 16, 1931.  C. FLAGSTAD  1,810,103
CLUTCH CONTROL DEVICE
Filed Dec. 31 1928    2 Sheets-Sheet 2

INVENTOR
CORNELL FLAGSTAD
BY
ATTORNEY

Patented June 16, 1931

1,810,103

UNITED STATES PATENT OFFICE

CORNELL FLAGSTAD, OF MINNEAPOLIS, MINNESOTA

CLUTCH CONTROL DEVICE

Application filed December 31, 1928. Serial No. 329,360.

This invention relates to clutch operating mechanism, and the primary object is to provide means of a simple, novel and practical nature for controlling the action of the usual foot clutch lever of a vehicle engine, whereby the clutch may be engaged and disengaged in a more efficient manner and with less effort on the part of the operator than has heretofore been permissible with the now used styles and constructions of clutch control devices. More particularly the object is to provide means in the form of a foot clutch lever attachment or accessory that will yieldingly hold the lever up so that it will not sag when the operator's foot may be merely resting upon it, and which sagging usually causes an undue slippage and wear on the clutch discs, but which means will be relieved, and in fact converted to pressure in the opposite direction, as soon as the pedal has been advanced a relatively short predetermined distance, with a result that the resistance to the foot pressure is not increased to the end of the pedal stroke, as is the case where a return spring is secured to the lever, and consequently the clutch may be manipulated with a minimum effort and without the loss of any advantage found in other clutches of which I am aware. A further object is to provide a clutch lever control device that will gradually release the lever so that the clutch will not close or be thrown into engagement with a sudden jar as is the case with other devices now in use, especially where an inexperienced or careless driver releases the clutch lever too quickly. Further and more specific objects will be disclosed in the course of the following specification, reference being had to the accompanying drawings, wherein:

Fig. 1 is a side elevation of a clutch control mechanism embodying my invention, and showing adjacent portions of the car floor and engine, a few fractional portions of the mechanism being broken away for purpose of illustration.

Fig. 2 is a detail sectional elevation on the line 2—2 in Fig. 1.

Fig. 3 is an enlarged detail elevation showing a modification in the device.

Fig. 4 is a side elevation, on a reduced scale, of a modified form of my improved clutch lever control device, with some parts omitted.

Figure 5:
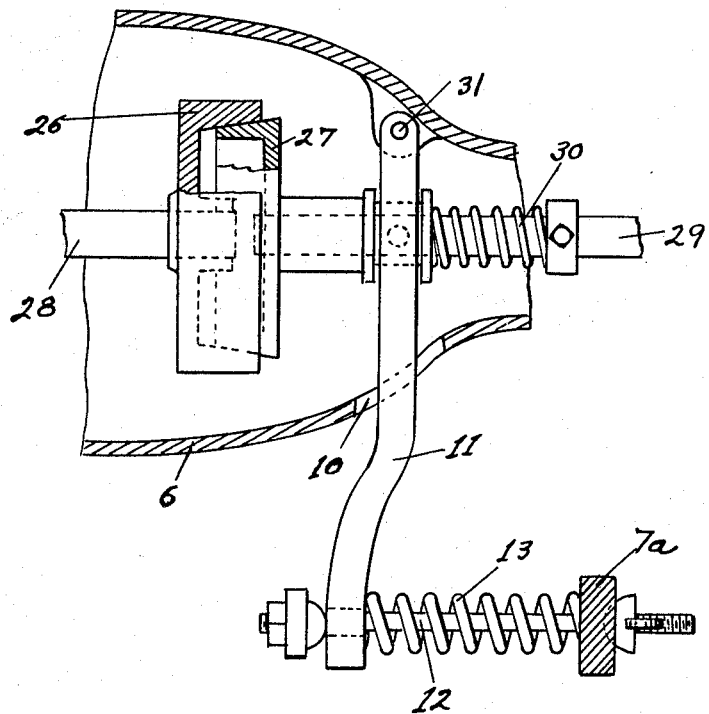
Fig. 5 is a sectional plan view of a conventional form of spring clutch, as seen on the line 5—5 in Fig. 1.

Referring to the drawings more particularly and by reference characters, 5 designates the floor of the car, and 6 the clutch and fly wheel housing portion of the engine. The foot operated clutch lever 7 is substantially L-shaped and pivots at its lower end to the housing 6, as at 8, and has an arcuate arm portion 7b that extends through a slot 9 in the floor 5, in the usual manner. Extending out through a slot 10, in the housing 6, is a lever 11 which operates the clutch within the housing. The clutch proper is of any suitable or well known construction, but is shown in Fig. 5 as comprising two clutch members 26 and 27, carried on respective aligned shafts 28 and 29, the member 27 being slidable on the shaft 29 and yieldingly held in engagement with the member 26 by a spring 30. The shipper lever 11 is fulcrumed as at 31 and moves the member 27 out of engagement with member 26, against the tension of the spring 30, when the foot lever 7 is depressed. The spring 30, within the clutch assembly, always tends to close the clutch and press the lever 11 forward in the slot 10. A depending arm 7a, of the foot lever 7, is connected to the clutch lever 11 by an adjustable bolt 12 about which is secured a spreader or expansion spring 13; and the lever 7 is further provided with an arm or lug 7b having a set screw 14 for stopping engagement with a member 15, to limit the upward movement of the foot lever. The construction and function of the devices 12—15 are well known in the art.

At the apex or angle of the lever, where the main arm 7 and the arcuate arm 7b join, I provide an integral or rigid lug 16, to which is pivotally secured as at 16a, one end of a bar or rod 17, the other end of which has a slot 18 for pivoting and sliding engagement with a pin 19 of a lug 20 which is rigid with some part of the car such as the housing 6.

Near the end 16a of the bar 17, I provide it with a shoulder 21 to receive one end of a partly compressed expansion spring 22. The other end of this spring, as shown in Fig. 1, abuts against a small head member 23 that also pivots on the pin 19, and has a slot to slidably receive the bar 17. As shown in Fig. 3 this spring rest may consist of a pair of washers 24, secured on the pin 19, one at each side of the bar.

It will be noted that the radius 16a—19 is considerably shorter than the radius 16a—8, and also that the pivot center 19 is so located that it will be crossed by a line passing through centers 16a—8 when the foot lever 7 is depressed to its lowest position as indicated by the dotted lines A in Fig. 1. Consequently the spring 22 will resist the downward motion of the lever until the pivot 16a reaches the dead center position in line with centers 19 and 8, as indicated by dotted lines B in Fig. 1. As the pedal 7 continues to move down, to completely disengage the clutch, the spring action is converted to a down pressure pushing the center 16a to its lowermost position as indicated by the dotted lines C. It will also be noted that as the pedal approaches the clutch disengaging position, indicated by dotted lines B, the spring 22 becomes more compressed and consequently offers more resistance, but this increased resistance is offset by the fact that pivot 16a is approaching the dead center position in line with centers 19 and 8, and consequently the actual resistance to the operator's foot is not increased. The lower part of the stroke i. e., while the pivot 16a passes from positions B to C requires but a relatively slight foot pressure, as it is supplemented by the now downwardly expanding spring 22, whereas in the usual construction, where a spring is connected directly to some part of the foot lever, the resistance is increased throughout the entire stroke. And such usual construction also has the disadvantage that the return spring effects a snapping back of the foot lever, when the latter is released, and thereby permits too abrupt a clutch engagement, while in the present instance the spring 22 actually retards the clutch engaging portion (C to B) of the stroke. It may also again be noted that when the pedal lever 7 is in its uppermost position it is held there under the upwardly spreading action of the spring 22, and cannot sag or vibrate when the parts are properly proportioned and adjusted.

In the modification shown in Fig. 4, the operation and function of the device is substantially the same as in Fig. 1, except that the pivot 19 is on the opposite side, from the pivot 16a, which, as illustrated by dotted lines, would pass a dead center between the centers 19 and 8. This arrangement might be more convenient to install in some instances.

It is understood that suitable modifications may be made in the general design and structural details of the invention as herein shown, provided, however, that said modifications come within the spirit and scope of the appended claims. Having now therefore fully shown and described my invention, what I claim to be new and desire to protect by Letters Patent is:

1. In combination with a clutch lever, means associated therewith for alternately effecting retarding and assisting actions to the clutch engaging and disengaging movements thereof, said means comprising an oscillatable compression spring connected at one end to the lever and at its other end to a stationary support at a point between the fulcrum of the lever and the arc defined by the swingable end of the spring.

2. The combination with a clutch lever, of a stationary pivot device, a bar pivotally secured at one end to the lever, and at its other end slidably and pivotally connected to said device, and a compression spring arranged on the bar, said pivot device being located between the fulcrum of the lever and the arc described by the lever attached end of the bar so that it will constitute a dead center for the spring action at a certain point in the lever stroke.

3. The combination including the clutch lever of a yieldably closed vehicle clutch, a pivotally mounted foot lever having a foot pedal at one end, a connection between the foot lever and the clutch lever, whereby an advanced movement of the foot lever will actuate the clutch lever to open the clutch, an oscillatable spring device, pivotally mounted at one end to a stationary pivot support and having pivot connection at its other end to the foot lever, the pivot support and pivot connection being so disposed that the operating radius of the spring device is substantially less than that between the pivot connection and the fulcrum center of the foot lever.

4. The combination including the clutch lever of a yieldably closed vehicle clutch, a pivotally mounted foot lever having a foot pedal at one end, a connection between the foot lever and the clutch lever, whereby an advanced movement of the foot lever will actuate the clutch lever to open the clutch, an oscillatable spring device pivotally mounted at one end to a stationary pivot support and having pivot connection at its other end to the foot lever, the pivot support and pivot connection being so disposed that the operating radius of the spring device is substantially less than that between the pivot connection and the fulcrum center of the foot lever, and said stationary pivot support being arranged so that the pivot connection will pass a dead center with respect thereto as the foot lever completes a full movement in either direction.

5. The combination with the clutch lever of a yieldingly closed motor vehicle clutch, of a fulcrumed foot lever having a substantially L-shaped pedal arm, a connection between the foot lever and the clutch lever, and a spring device connected to the pedal arm at a point adjacent the apex of its angle for alternately effecting retarding and assisting actions to each clutch disengaging stroke thereof.

6. The combination with the clutch lever of a yieldingly closed motor vehicle clutch, of a fulcrumed foot lever having a substantially L-shaped pedal arm, a connection between the foot lever and the clutch lever, and a spring device connected to the pedal arm at a point adjacent the apex of its angle for alternately effecting retarding and assisting actions to each clutch engaging stroke thereof.

In testimony whereof I affix my signature.

CORNELL FLAGSTAD.